(12) United States Patent
Merriman et al.

(10) Patent No.: US 8,852,781 B2
(45) Date of Patent: Oct. 7, 2014

(54) BATTERY CELL ASSEMBLY AND METHOD FOR MANUFACTURING A COOLING FIN FOR THE BATTERY CELL ASSEMBLY

(75) Inventors: Robert Merriman, Shelby Township, MI (US); Michael Nielson, Royal Oak, MI (US); Igor Isayev, Farmington Hills, MI (US); Satish Ketkar, Troy, MI (US)

(73) Assignee: LG Chem, Ltd., Seoul (KR)

( * ) Notice: Subject to any disclaimer, the term of this patent is extended or adjusted under 35 U.S.C. 154(b) by 262 days.

(21) Appl. No.: 13/475,963

(22) Filed: May 19, 2012

(65) Prior Publication Data

US 2013/0309542 A1 Nov. 21, 2013

(51) Int. Cl.
*H01M 10/50* (2006.01)

(52) U.S. Cl.
USPC ............................................................ 429/120

(58) Field of Classification Search
None
See application file for complete search history.

(56) References Cited

U.S. PATENT DOCUMENTS

| | | |
|---|---|---|
| 1,587,425 A | 6/1926 | Schepp |
| 2,273,244 A | 2/1942 | Ambruster |
| 2,391,859 A | 1/1946 | Babcock |
| 3,503,558 A | 3/1970 | Galiulo et al. |
| 3,522,100 A | 7/1970 | Lindstrom |
| 3,550,681 A | 12/1970 | Stier et al. |
| 3,964,930 A | 6/1976 | Reiser |
| 4,009,752 A | 3/1977 | Wilson |
| 4,063,590 A | 12/1977 | Mcconnell |
| 4,298,904 A | 11/1981 | Koenig |
| 4,305,456 A | 12/1981 | Mueller et al. |
| 4,322,776 A | 3/1982 | Job et al. |
| 4,444,994 A | 4/1984 | Baker et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |

(Continued)

FOREIGN PATENT DOCUMENTS

| | | |
|---|---|---|
| DE | 19639115 A | 3/1998 |
| EP | 1577966 A | 9/2005 |

(Continued)

OTHER PUBLICATIONS

"Gasket". Merriam-Webster. Merriam-Webster. Web. May 30, 2012. <http://www.merriam-webster.com/dictionary/gasket>.

(Continued)

*Primary Examiner* — Jonathan Crepeau
(74) *Attorney, Agent, or Firm* — Buckert Patent & Trademark Law Firm, P.C.; John F. Buckert

(57) ABSTRACT

A battery cell assembly is provided. The battery cell assembly includes a cooling fin having a rectangular-shaped aluminum plate, a tube, and a flexible thermally conductive sheet. The plate has a first side and a second side. The tube is coupled to the first side of the plate and extends on at least first, second, and third peripheral edge portions of the plate. The flexible thermally conductive sheet is disposed on the first side of the plate. The battery cell assembly further includes a battery cell disposed against the flexible thermally conductive sheet of the cooling fin.

13 Claims, 9 Drawing Sheets

(56) References Cited

U.S. PATENT DOCUMENTS

| | | | |
|---|---|---|---|
| 5,071,652 A | 12/1991 | Jones et al. | |
| 5,186,250 A | 2/1993 | Ouchi et al. | |
| 5,214,564 A | 5/1993 | Metzler et al. | |
| 5,270,131 A | 12/1993 | Diethelm et al. | |
| 5,322,745 A | 6/1994 | Yanagihara et al. | |
| 5,329,988 A | 7/1994 | Juger | |
| 5,346,786 A | 9/1994 | Hodgetts | |
| 5,356,735 A | 10/1994 | Meadows et al. | |
| 5,443,926 A | 8/1995 | Holland et al. | |
| 5,510,203 A | 4/1996 | Hamada et al. | |
| 5,520,976 A | 5/1996 | Giannetti et al. | |
| 5,663,007 A | 9/1997 | Ikoma et al. | |
| 5,731,568 A * | 3/1998 | Malecek | 219/209 |
| 5,736,836 A | 4/1998 | Hasegawa et al. | |
| 5,756,227 A | 5/1998 | Suzuki et al. | |
| 5,937,664 A | 8/1999 | Matsuno et al. | |
| 5,985,483 A | 11/1999 | Verhoog et al. | |
| 6,087,036 A | 7/2000 | Rouillard et al. | |
| 6,111,387 A | 8/2000 | Kouzu et al. | |
| 6,176,095 B1 | 1/2001 | Porter | |
| 6,289,979 B1 | 9/2001 | Kato | |
| 6,344,728 B1 | 2/2002 | Kouzu et al. | |
| 6,362,598 B2 | 3/2002 | Laig-Horstebrock et al. | |
| 6,399,238 B1 | 6/2002 | Oweis et al. | |
| 6,422,027 B1 | 7/2002 | Coates, Jr. et al. | |
| 6,448,741 B1 | 9/2002 | Inui et al. | |
| 6,462,949 B1 | 10/2002 | Parish, IV et al. | |
| 6,512,347 B1 | 1/2003 | Hellmann et al. | |
| 6,569,556 B2 | 5/2003 | Zhou et al. | |
| 6,662,891 B2 | 12/2003 | Misu et al. | |
| 6,689,510 B1 | 2/2004 | Gow et al. | |
| 6,696,197 B2 | 2/2004 | Inagaki et al. | |
| 6,703,160 B2 * | 3/2004 | Gao | 429/120 |
| 6,724,172 B2 | 4/2004 | Koo | |
| 6,750,630 B2 | 6/2004 | Inoue et al. | |
| 6,775,998 B2 | 8/2004 | Yuasa et al. | |
| 6,780,538 B2 | 8/2004 | Hamada et al. | |
| 6,821,671 B2 | 11/2004 | Hinton et al. | |
| 6,826,948 B1 | 12/2004 | Bhatti et al. | |
| 6,878,485 B2 | 4/2005 | Ovshinsky et al. | |
| 6,982,131 B1 | 1/2006 | Hamada et al. | |
| 7,070,874 B2 | 7/2006 | Blanchet et al. | |
| 7,143,124 B2 | 11/2006 | Garthwaite | |
| 7,150,935 B2 | 12/2006 | Hamada et al. | |
| 7,250,741 B2 | 7/2007 | Koo et al. | |
| 7,264,902 B2 | 9/2007 | Horie et al. | |
| 7,278,389 B2 | 10/2007 | Kirakosyan | |
| 7,467,525 B1 | 12/2008 | Ohta et al. | |
| 7,531,270 B2 | 5/2009 | Buck et al. | |
| 7,795,845 B2 | 9/2010 | Cho | |
| 7,797,958 B2 | 9/2010 | Alston et al. | |
| 7,816,029 B2 | 10/2010 | Takamatsu et al. | |
| 7,846,573 B2 | 12/2010 | Kelly | |
| 7,879,480 B2 | 2/2011 | Yoon et al. | |
| 7,883,793 B2 | 2/2011 | Niedzwiecki et al. | |
| 7,976,978 B2 | 7/2011 | Shin et al. | |
| 7,981,538 B2 | 7/2011 | Kim et al. | |
| 7,997,367 B2 | 8/2011 | Nakamura | |
| 8,007,915 B2 | 8/2011 | Kurachi | |
| 8,030,886 B2 | 10/2011 | Mahalingam et al. | |
| 8,067,111 B2 | 11/2011 | Koetting et al. | |
| 8,209,991 B2 | 7/2012 | Kondou et al. | |
| 8,409,743 B2 | 4/2013 | Okada et al. | |
| 2002/0182493 A1 | 12/2002 | Ovshinsky et al. | |
| 2003/0080714 A1 | 5/2003 | Inoue et al. | |
| 2003/0094263 A1 * | 5/2003 | Garcia et al. | 165/80.2 |
| 2003/0211384 A1 | 11/2003 | Hamada et al. | |
| 2004/0069474 A1 | 4/2004 | Wu et al. | |
| 2005/0026014 A1 | 2/2005 | Fogaing et al. | |
| 2005/0089750 A1 | 4/2005 | Ng et al. | |
| 2005/0103486 A1 | 5/2005 | Demuth et al. | |
| 2005/0110460 A1 | 5/2005 | Arai et al. | |
| 2005/0134038 A1 | 6/2005 | Walsh | |
| 2006/0234119 A1 | 10/2006 | Kruger et al. | |
| 2006/0286450 A1 | 12/2006 | Yoon et al. | |
| 2007/0062681 A1 | 3/2007 | Beech | |
| 2007/0087266 A1 | 4/2007 | Bourke et al. | |
| 2007/0227166 A1 | 10/2007 | Rafalovich et al. | |
| 2008/0003491 A1 | 1/2008 | Yahnker et al. | |
| 2008/0041079 A1 | 2/2008 | Nishijima et al. | |
| 2008/0110189 A1 | 5/2008 | Alston et al. | |
| 2008/0182151 A1 | 7/2008 | Mizusaki et al. | |
| 2008/0248338 A1 | 10/2008 | Yano et al. | |
| 2008/0299446 A1 | 12/2008 | Kelly | |
| 2008/0314071 A1 | 12/2008 | Ohta et al. | |
| 2009/0074478 A1 | 3/2009 | Kurachi | |
| 2009/0087727 A1 | 4/2009 | Harada et al. | |
| 2009/0104512 A1 | 4/2009 | Fassnacht et al. | |
| 2009/0155680 A1 | 6/2009 | Maguire et al. | |
| 2009/0186265 A1 | 7/2009 | Koetting et al. | |
| 2009/0258288 A1 | 10/2009 | Weber et al. | |
| 2009/0258289 A1 | 10/2009 | Weber et al. | |
| 2009/0280395 A1 | 11/2009 | Nemesh et al. | |
| 2009/0325051 A1 | 12/2009 | Niedzwiecki et al. | |
| 2009/0325052 A1 | 12/2009 | Koetting et al. | |
| 2009/0325054 A1 | 12/2009 | Payne et al. | |
| 2009/0325055 A1 | 12/2009 | Koetting et al. | |
| 2010/0112419 A1 | 5/2010 | Jang et al. | |
| 2010/0203376 A1 | 8/2010 | Choi et al. | |
| 2010/0209760 A1 | 8/2010 | Yoshihara et al. | |
| 2010/0262791 A1 | 10/2010 | Gilton | |
| 2010/0275619 A1 | 11/2010 | Koetting et al. | |
| 2010/0276132 A1 | 11/2010 | Payne | |
| 2010/0279152 A1 | 11/2010 | Payne | |
| 2010/0279154 A1 | 11/2010 | Koetting et al. | |
| 2011/0027640 A1 | 2/2011 | Gadawski et al. | |
| 2011/0041525 A1 | 2/2011 | Kim et al. | |
| 2011/0045326 A1 | 2/2011 | Leuthner et al. | |
| 2011/0052959 A1 | 3/2011 | Koetting et al. | |
| 2012/0082880 A1 | 4/2012 | Koetting et al. | |
| 2013/0045410 A1 * | 2/2013 | Yang et al. | 429/120 |
| 2013/0255293 A1 | 10/2013 | Gadawski et al. | |
| 2013/0309542 A1 | 11/2013 | Merriman et al. | |
| 2014/0050953 A1 | 2/2014 | Yoon et al. | |
| 2014/0050966 A1 | 2/2014 | Merriman et al. | |
| 2014/0147709 A1 | 5/2014 | Ketkar et al. | |

FOREIGN PATENT DOCUMENTS

| | | | |
|---|---|---|---|
| EP | 1852925 A | 11/2007 | |
| EP | 2262048 A | 12/2010 | |
| GB | 481891 A | 3/1938 | |
| JP | 08111244 | 4/1996 | |
| JP | 09129213 | 5/1997 | |
| JP | 09219213 | 8/1997 | |
| JP | 2001105843 A | 4/2001 | |
| JP | 2002038033 A | 2/2002 | |
| JP | 2002319383 A | 10/2002 | |
| JP | 2002333255 A | 11/2002 | |
| JP | 2003188323 A | 7/2003 | |
| JP | 2003282112 A | 10/2003 | |
| JP | 2004333115 A | 11/2004 | |
| JP | 2005126315 A | 5/2005 | |
| JP | 2005147443 A | 6/2005 | |
| JP | 2005349955 A | 12/2005 | |
| JP | 2006139928 A | 6/2006 | |
| JP | 2007305425 A | 11/2007 | |
| JP | 2008054379 A | 3/2008 | |
| JP | 2008062875 A | 3/2008 | |
| JP | 2008080995 A | 4/2008 | |
| JP | 2008159440 A | 7/2008 | |
| JP | 2009009889 A | 1/2009 | |
| JP | 2009054297 A | 3/2009 | |
| KR | 20050092605 A | 9/2005 | |
| KR | 100637472 B1 | 10/2006 | |
| KR | 100765659 B1 | 10/2007 | |
| KR | 20080047641 A | 5/2008 | |
| KR | 20090082212 A | 7/2009 | |
| KR | 100921346 B1 | 10/2009 | |
| KR | 20090107443 A | 10/2009 | |
| KR | 1020100119497 A | 11/2010 | |
| KR | 1020100119498 A | 11/2010 | |
| KR | 1020110013269 A | 2/2011 | |
| KR | 1020110013270 A | 2/2011 | |

(56) References Cited

FOREIGN PATENT DOCUMENTS

| KR | 20110126764 A | | 11/2011 |
|---|---|---|---|
| WO | 2006101343 A | | 9/2006 |
| WO | 2007007503 A | | 1/2007 |
| WO | 2007115743 A2 | | 10/2007 |
| WO | 2008111162 A | | 9/2008 |
| WO | 2009073225 A | | 6/2009 |
| WO | WO 2011/145830 | * | 11/2011 |

OTHER PUBLICATIONS

International Search Report; International Application No. PCT/KR2009/000258; International Filing Date: Jan. 16, 2009; Date of Mailing: Aug. 28, 2009; 2 pages.

International Search Report; International Application No. PCT/KR2009/003428, International Filing Date: Jun. 25, 2009; Date of Mailing: Jan. 22, 2010; 2 pages.

International Search Report; International Application No. PCT/KR2009/003429; International Filing Date: Jun. 25, 2009; Date of Mailing: Jan. 12, 2010; 3 pages.

International Search Report; International Application No. PCT/KR2009/003430; International Filing Date: Jun. 25, 2009; Date of Mailing: Feb. 3, 2010; 2 pages.

International Search Report; International Application No. PCT/KR2009/003434; International Filing Date: Jun. 25, 2009; Date of Mailing: Jan. 18, 2010; 2 pages.

International Search Report; International Application No. PCT/KR2009/003436; International Filing Date: Jun. 25, 2009; Date of Mailing: Jan. 22, 2010; 2 pages.

International Search Report; International Application No. PCT/KR2009/006121; International Filing Date: Oct. 22, 2009; Date of Mailing: May 3, 2010; 2 pages.

International Search Report; International Application No. PCT/KR2010/002334; International Filing Date: Apr. 15, 2010; Date of Mailing: Nov. 29, 2010; 2 pages.

International Search Report; International Application No. PCT/KR2010/002336; International Filing Date: Apr. 15, 2010; Date of Mailing: Jan. 31, 2011; 2 pages.

International Search Report; International Application No. PCT/KR2010/002337; International Filing Date: Apr. 15, 2010; Date of Mailing: May 3, 2010; 2 pages.

International Search Report; International Application No. PCT/KR2010/002340; International Filing Date: Apr. 15, 2010; Date of Mailing: Jan. 31, 2011; 2 pages.

International Search Report; International Application No. PCT/KR2010/004944; International Filing Date: Jul. 28, 2010; Date of Mailing: Apr. 29, 2011; 2 pages.

International Search Report; International Application No. PCT/KR2010/005639; International Filing Date: Aug. 24, 2010; Date of Mailing: Jun. 3, 2011; 2 pages.

Machine translation of Japanese Patent Application No. 2009-009889 A, published Jan. 15, 2009.

Thomas J. Gadawski et al., pending U.S. Appl. No. 13/433,649 entitled "Battery System and Method for Cooling the Battery System," filed with the U.S. Patent and Trademark Office on Mar. 29, 2012.

International Search Report for International application No. PCT/KR2013/004015 dated Sep. 26, 2013.

U.S. Appl. No. 13/586,960, filed Aug. 16, 2012 entitled Battery Module.

U.S. Appl. No. 13/587,030, filed Aug. 16, 2012 entitled Battery Module and Method for Assembling the Battery Module.

U.S. Appl. No. 13/766,162, filed Feb. 13, 2013 entitled Battery Cell Assembly and Method for Manufacturing the Battery Cell Assembly.

U.S. Appl. No. 13/861,426, filed Apr. 12, 2013 entitled Battery Cell Assembly and Method for Manufacturing a Cooling Fin for the Battery Cell Assembly.

U.S. Appl. No. 13/936,556, filed Jul. 8, 2013 entitled Battery Assembly.

U.S. Appl. No. 14/059,547, filed Oct. 22, 2013 entitled Battery Cell Assembly.

U.S. Appl. No. 14/161,806, filed Jan. 23, 2014 entitled Battery Cell Assembly and Method for Coupling a Cooling Fin to First and Second Cooling Manifolds.

U.S. Appl. No. 14/273,572, filed May 9, 2014 entitled Battery Pack and Method of Assembling the Battery Pack.

U.S. Appl. No. 14/273,586, filed May 9, 2014 entitled Battery Module and Method of Assembling the Battery Module.

U.S. Appl. No. 14/328,000, filed Jul. 10, 2014 entitled Battery System and Method of Cooling the Battery System.

U.S. Appl. No. 14/330,163, filed Jul. 14, 2014 entitled Battery System and Method for Cooling the Battery System.

U.S. Appl. No. 13/686,018, filed Nov. 27, 2012 entitled Battery System and Method for Cooling a Battery Cell Assembly.

Written Opinion for International application No. PCT/KR2014/002090 dated May 26, 2014.

* cited by examiner

BATTERY CELL ASSEMBLY AND METHOD FOR MANUFACTURING A COOLING FIN FOR THE BATTERY CELL ASSEMBLY

BACKGROUND

The inventors have recognized that during a brazing process of a cooling fin utilized in a battery cell assembly, a side of the cooling fin may have an abrasive residue formed thereon which can undesirably rub against an adjacent battery cell.

Accordingly, the inventors herein have recognized a need for an improved battery cell assembly and a method for manufacturing a cooling fin in the battery cell assembly that minimizes and/or eliminates the above-mentioned deficiency.

SUMMARY

A battery cell assembly in accordance with an exemplary embodiment is provided. The battery cell assembly includes a cooling fin having a generally rectangular-shaped aluminum plate, a tube, and a flexible thermally conductive sheet. The generally rectangular-shaped aluminum plate has a first side and a second side. The tube is coupled to the first side of the of the generally rectangular-shaped aluminum plate and extends on at least first, second, and third peripheral edge portions of the generally rectangular-shaped aluminum plate. The flexible thermally conductive sheet is disposed on the first side of the generally rectangular-shaped aluminum plate. The battery cell assembly further includes a battery cell disposed against the flexible thermally conductive sheet of the cooling fin.

A method for manufacturing a cooling fin for a battery cell assembly in accordance with another exemplary embodiment is provided. The method includes providing a generally rectangular-shaped aluminum plate, a tube, and a flexible thermally conductive sheet. The generally rectangular-shaped aluminum plate has a first side and a second side. The method further includes brazing the tube to the first side of the of the generally rectangular-shaped aluminum plate such that the tube extends on at least first, second, and third peripheral edge portions of the generally rectangular-shaped aluminum plate. The method further includes attaching the flexible thermally conductive sheet on the first side of the generally rectangular-shaped aluminum plate.

DETAILED DESCRIPTION

Figure 1:
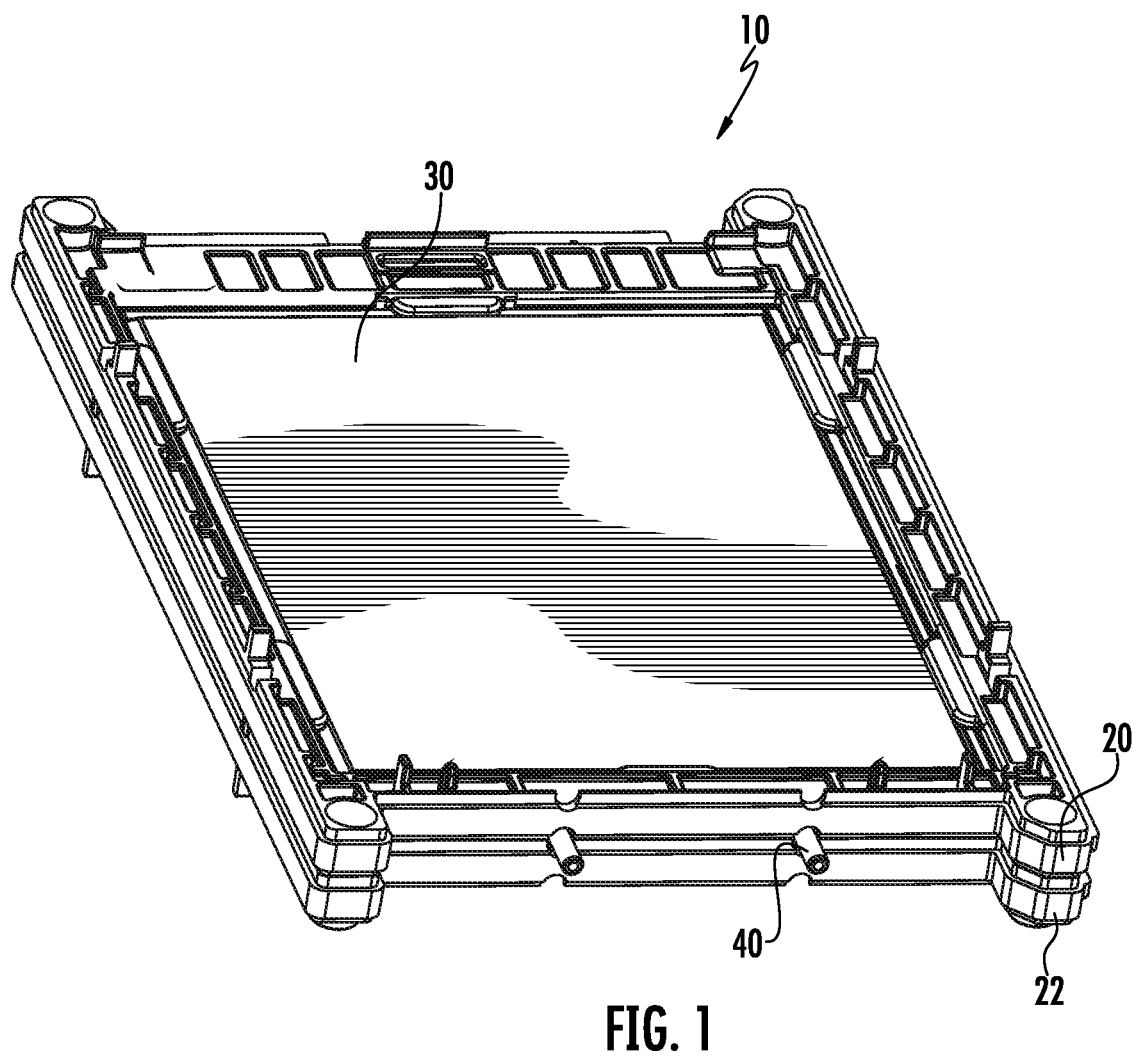
FIG. 1 is a schematic of a battery cell assembly in accordance with an exemplary embodiment.
Figure 2:
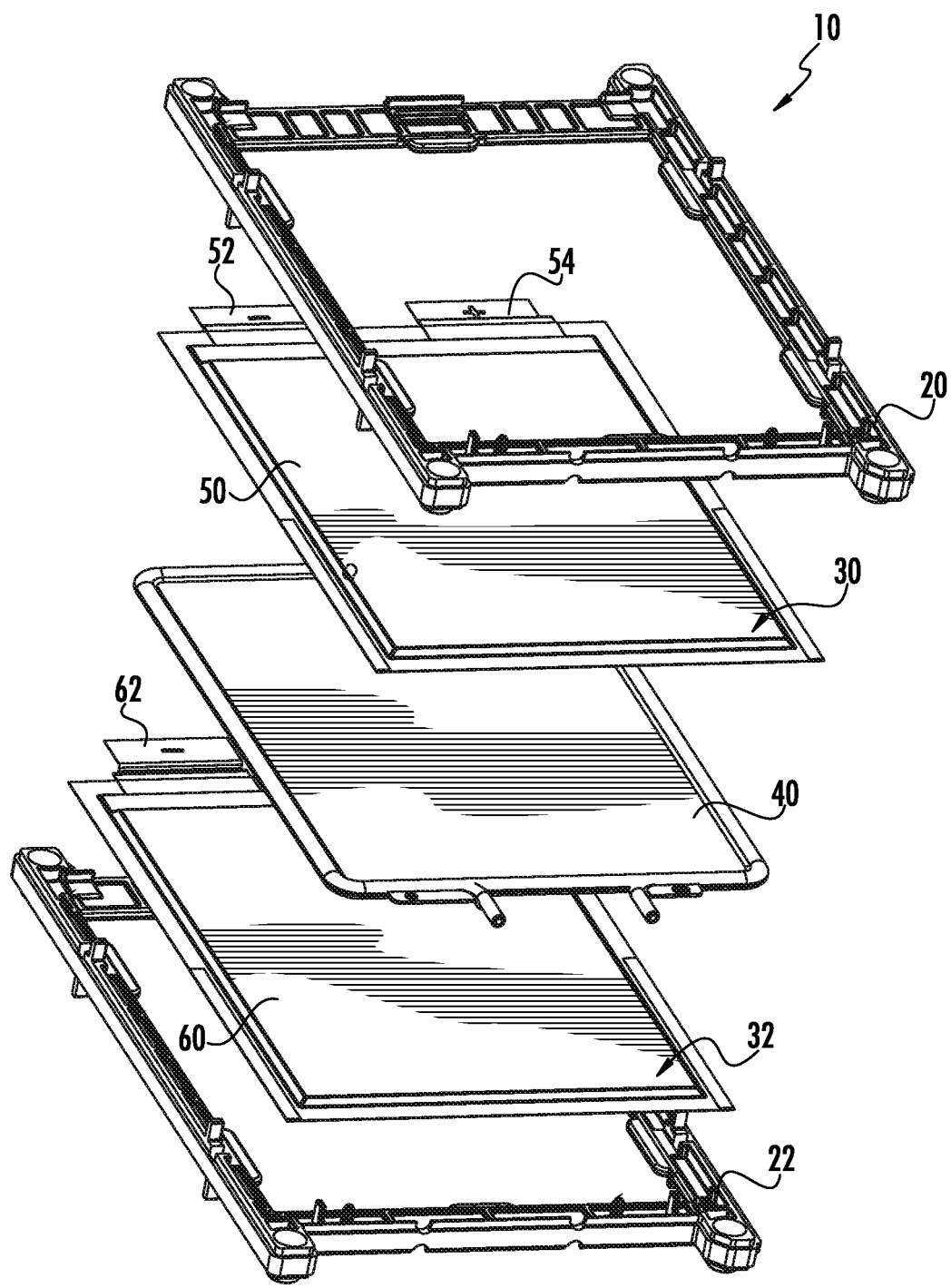
FIG. 2 is an exploded view of the battery cell assembly of FIG. 1.
Figure 3:
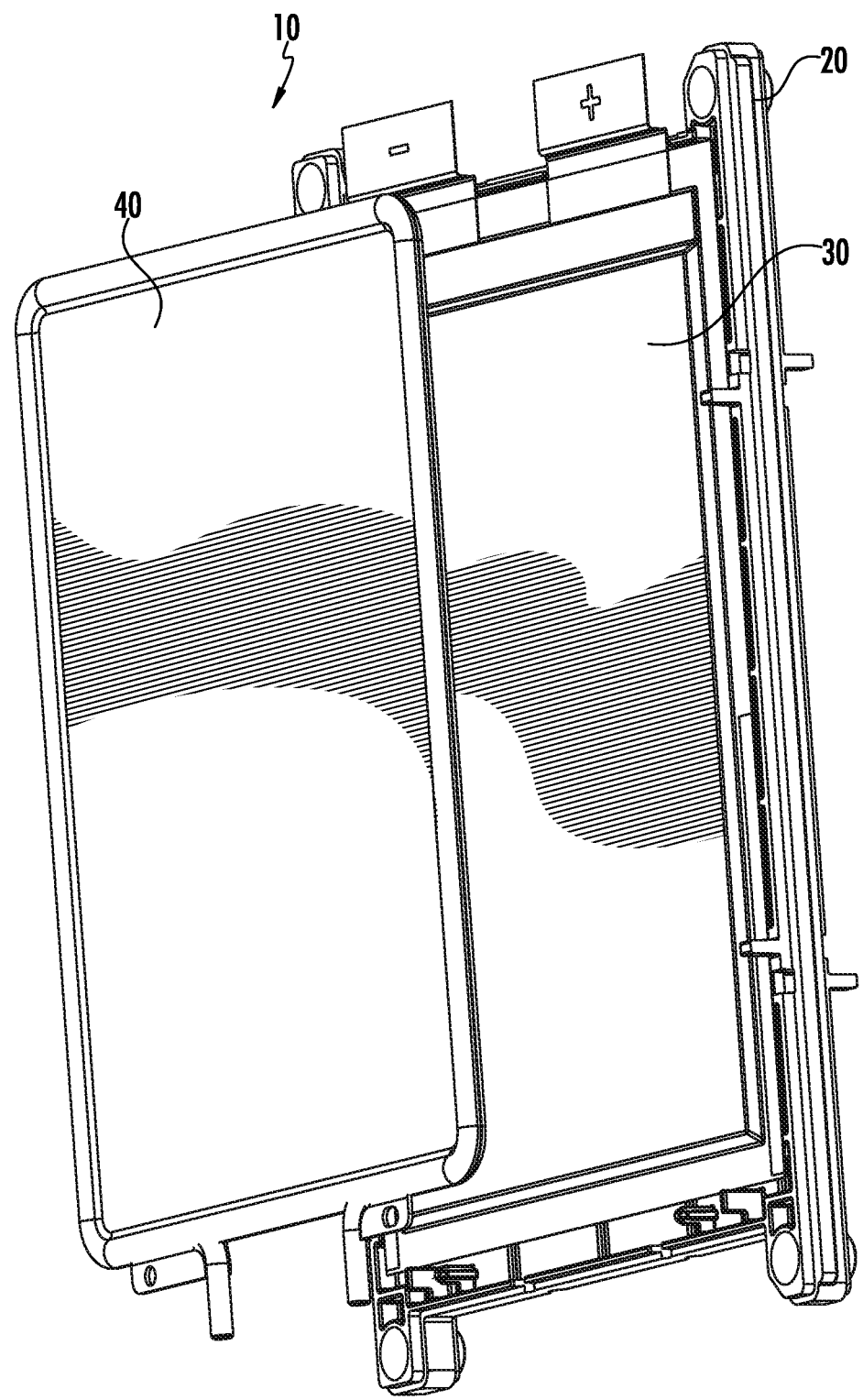
FIG. 3 is an exploded view of a portion of the battery cell assembly of FIG. 1.

Referring to FIGS. 1-5, a battery cell assembly 10 in accordance with an exemplary embodiment is provided. The battery cell assembly 10 includes rectangular ring-shaped frame members 20, 22, battery cells 30, 32, and a cooling fin 40. An advantage of the battery cell assembly 10 is that the assembly 10 utilizes a cooling fin 40 having a rectangular-shaped aluminum plate 80 with a flexible thermally conductive sheet 84 disposed thereon. As a result, a relatively rough surface on the aluminum plate due to a brazing process is covered by the flexible thermally conductive sheet 84 having a relatively smooth surface which is disposed against an adjacent battery cell and eliminates abrasive rubbing against the battery cell by the rough surface. Further, the flexible thermally conductive sheet 84 has excellent thermal characteristics for conducting heat energy from the battery cell to the aluminum plate 80.

The rectangular ring-shaped frame members 20, 22 are configured to be coupled together to hold the battery cells 30, 32 and the cooling fin 40 therebetween. In one exemplary embodiment, the rectangular ring-shaped frame members 20, 22 are constructed of plastic. However, in alternative embodiments, the rectangular ring-shaped frame members 20, 22 could be constructed of other materials known to those skilled in the art.

The battery cells 30, 32 are each configured to generate an operational voltage. In one exemplary embodiment, each of the battery cells 30, 32 are pouch-type lithium-ion battery cells. Of course, other types of battery cells known to those skilled in the art could be utilized. Also, in an exemplary embodiment, the battery cells 30, 32 are electrically coupled in series to one another.

The battery cell 30 includes a rectangular-shaped pouch 50 and electrodes 52, 54 extending from the pouch 50. The battery cell 30 is disposed between the rectangular ring-shaped frame member 20 and the cooling fin 40.

The battery cell 32 includes a rectangular-shaped pouch 60, an electrode 62 and another electrode (not shown). The battery cell 32 is disposed between the rectangular ring-shaped frame member 22 and the cooling fin 40.

Referring to FIGS. 2-7, the cooling fin 40 is provided to transfer heat energy from the battery cells 30, 32 to a refrigerant or a liquid flowing through the cooling fin 40 to cool the battery cells 30, 32. The cooling fin 40 includes a generally rectangular-shaped aluminum plate 80, a tube 82, and a flexible thermally conductive sheet 84.

The rectangular-shaped aluminum plate 80 has a first side 90 and a second side 92. The plate 80 further includes first, second, third, and fourth peripheral edge portions 100, 102, 104, 106 (shown in FIG. 5) that are each arcuate-shaped to hold a portion of the tube 82 thereon. In other words, the first, second, third, and fourth peripheral edge portions 100, 102, 104, 106 define an arcuate-shaped groove 109 (shown in FIG. 6) configured to receive the tube 82 thereon.

Figure 4:
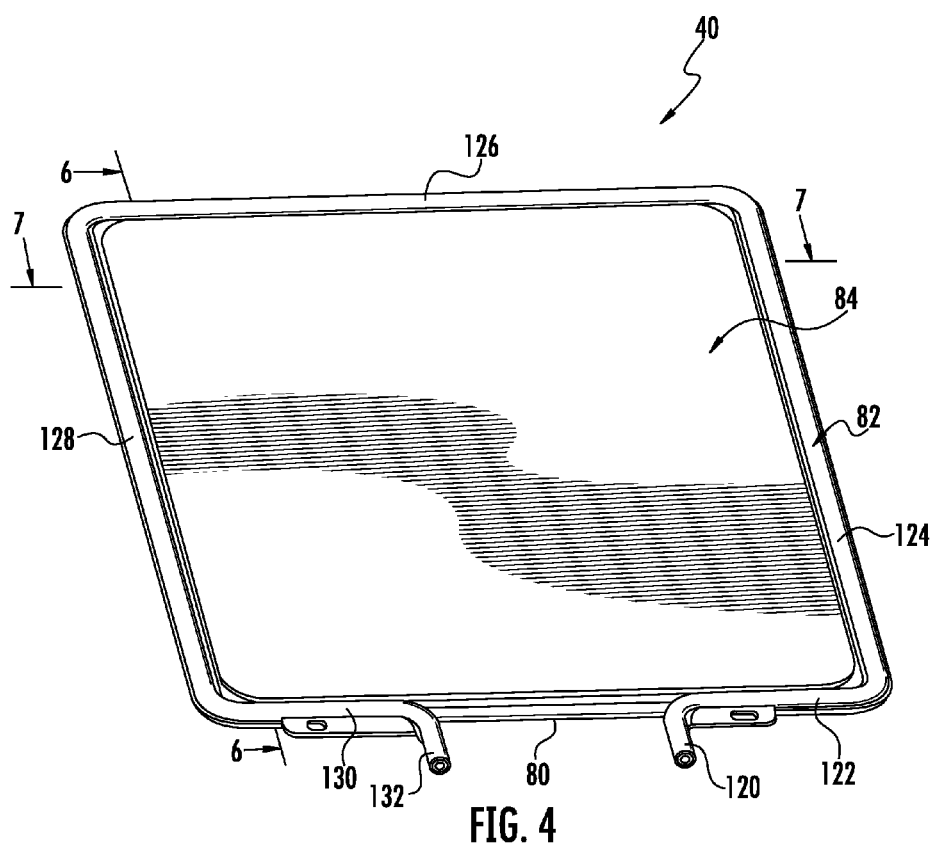
FIG. 4 is a schematic of a cooling fin utilized in the battery cell assembly of FIG. 1.

The tube 82 is coupled to the first side 90 of the generally rectangular-shaped aluminum plate 80, and is coupled to and extends on the first, second, third, and fourth peripheral edge portions 100, 102, 104, 106 of the plate 80. In one exemplary embodiment, the tube 82 is constructed of aluminum. However, the tube 82 could be constructed of other materials known to those skilled in the art. Referring to FIG. 4, the tube 82 includes an inlet port 120, tube portions 122, 124, 126, 128, 130, and an outlet port 132. The inlet port 120 is coupled to the tube portion 122. The tube portion 122 is coupled between the inlet port 120 and the tube portion 124. The tube portion 126 is coupled between the tube portion 124 and the tube portion 128. The tube portion 130 is coupled between the tube portion 128 and the outlet port 132.

Figure 5:
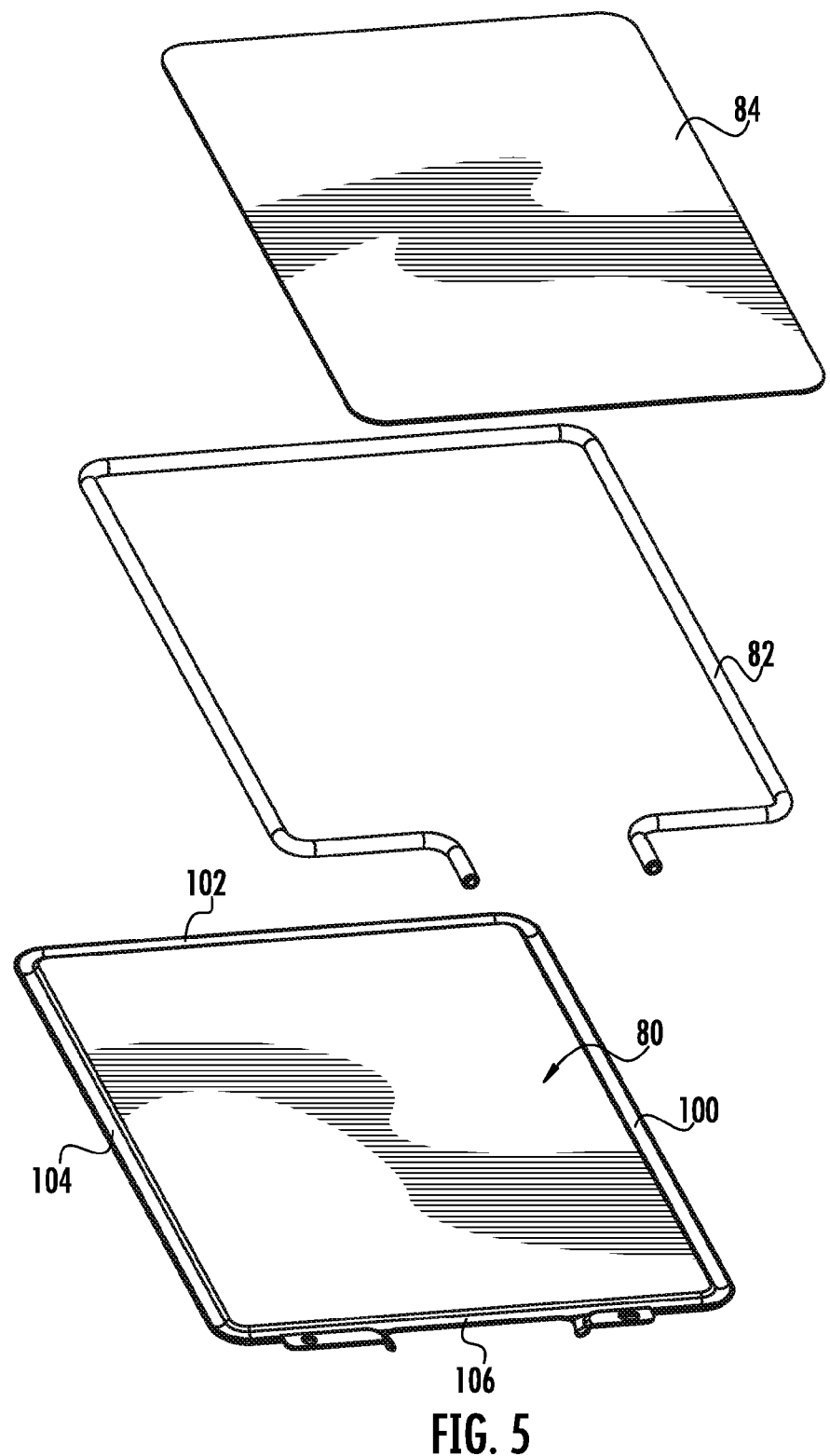
FIG. 5 is an exploded view of the cooling fin of FIG. 4.

Also, referring to FIGS. 4 and 5, the tube portion 122 is coupled to the fourth peripheral edge portion 106, and the tube portion 124 is coupled to the first peripheral edge portion 100, via brazing. The tube portion 126 is coupled to the second peripheral edge portion 102, and the tube portion 128 is coupled to the third peripheral edge portion 104, via brazing. Also, the tube portion 130 is coupled to the fourth peripheral edge portion 106 via brazing.

Figure 6:
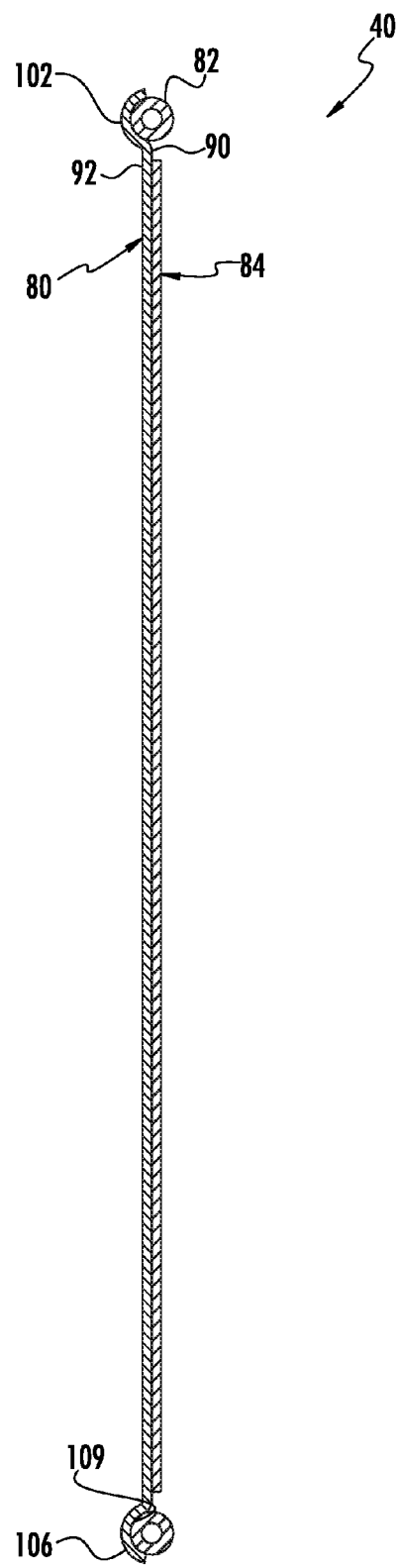
FIG. 6 is a cross-sectional view of a portion of the cooling fin of FIG. 4 taken along line 6-6.
Figure 7:
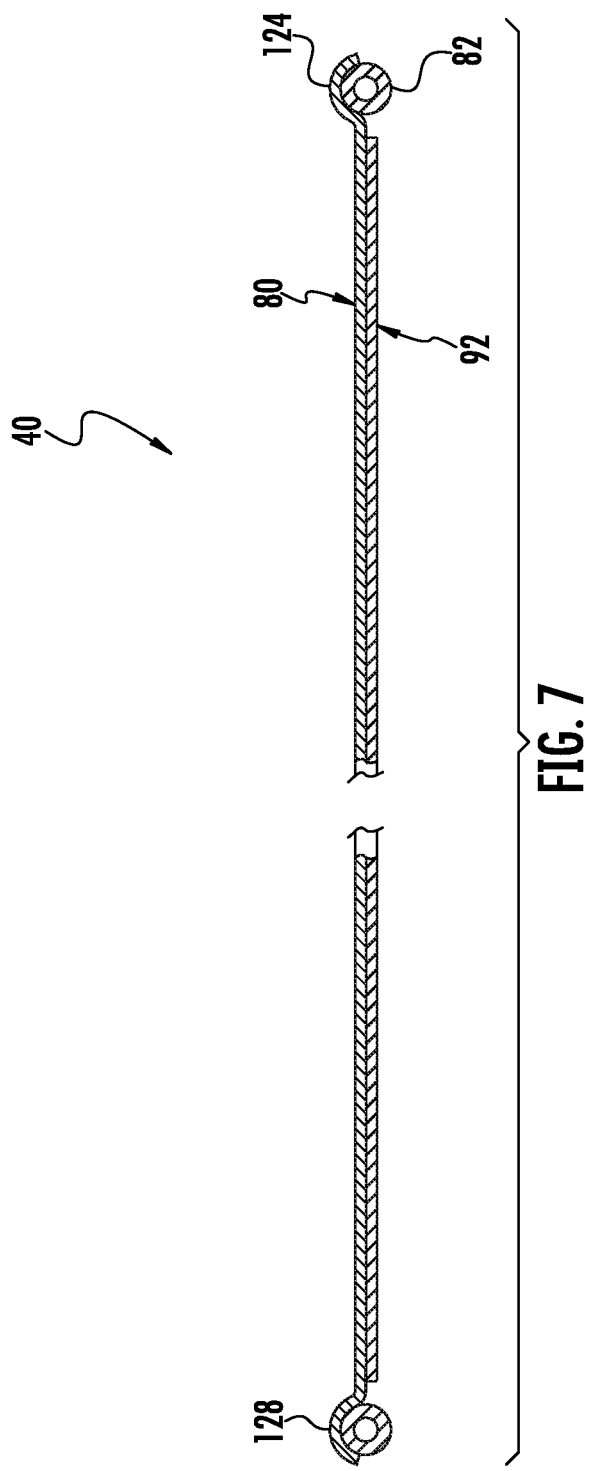
FIG. 7 is a cross-sectional view of a portion of the cooling fin of FIG. 4 taken along line 7-7.
Figure 8:
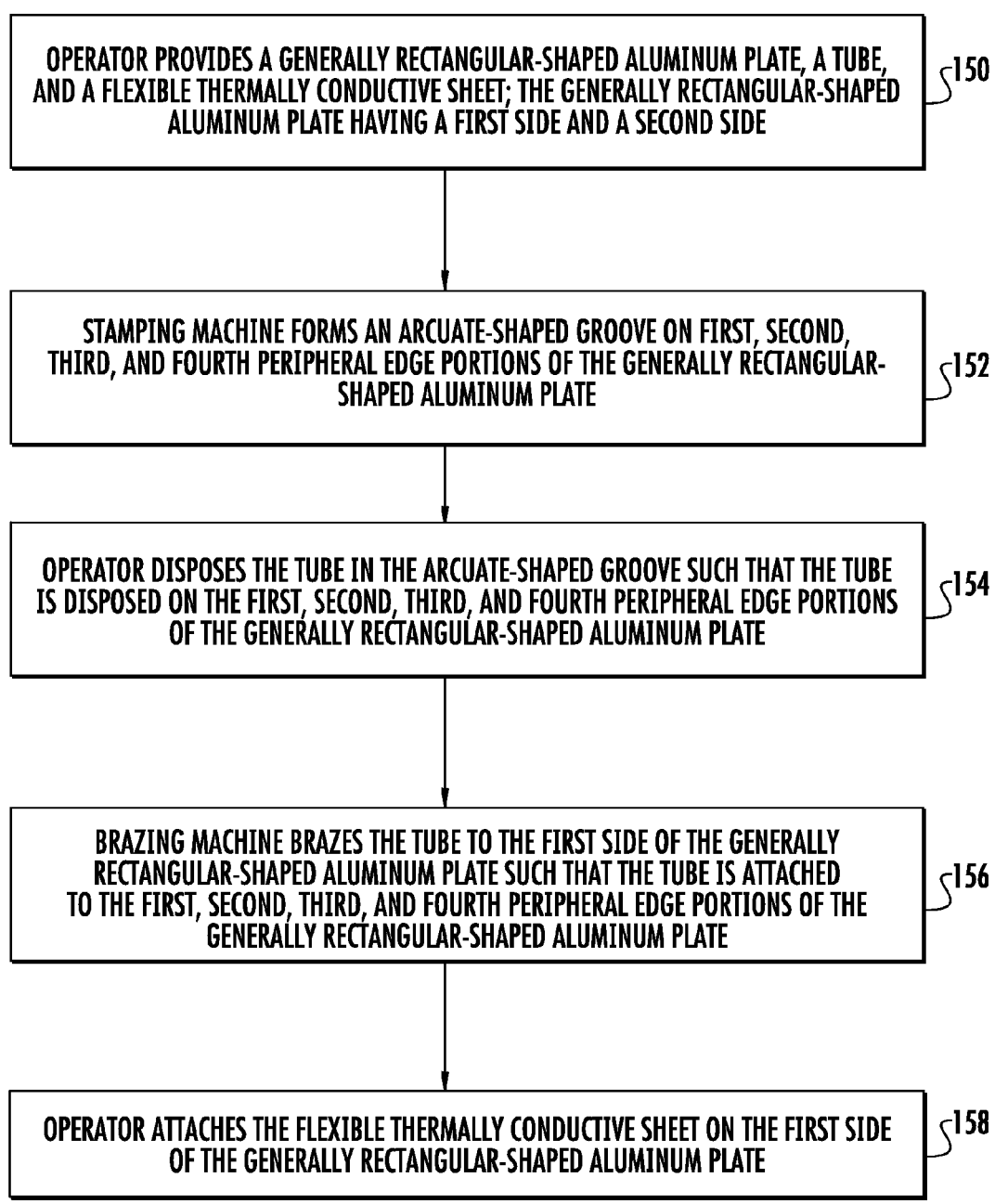
FIG. 8 is a flowchart of a method for manufacturing the cooling fin of FIG. 4 in accordance with another exemplary embodiment.
Figure 9:
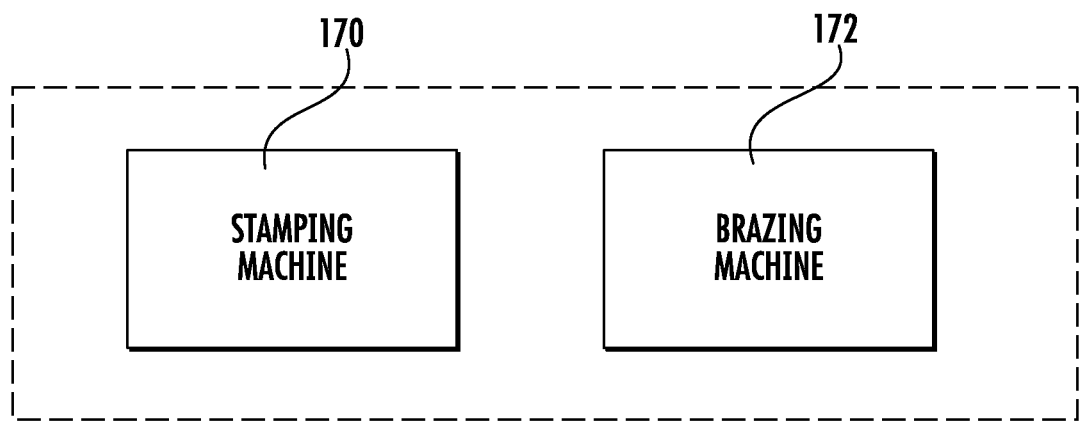
FIG. 9 is a block diagram of a stamping machine and a brazing machine utilized to manufacture the cooling fin of FIG. 4.
Figure 10:
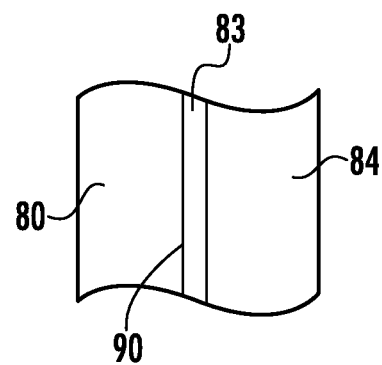
FIG. 10 is an enlarged cross-sectional view of a portion of the cooling fin of FIG. 4.

Referring to FIGS. 6 and 7, the flexible thermally conductive sheet 84 is disposed on the first side 90 of the generally rectangular-shaped aluminum plate 80. In one exemplary embodiment, the flexible thermally conductive sheet 84 comprises a flexible sheet constructed at least in part utilizing graphite having a thickness in a range of 0.25-0.5 millimeters. Further, the sheet 84 has an in-plane (e.g., planar with a surface of the sheet 84 contacting the plate 80) heat conductivity of greater than 200 Watts/meter—Kelvin. Also, in one exemplary embodiment, a side of the sheet 84 contacting the battery cell 30 has a roughness average (RA) in a range of 0.8-4.0 micro inches. Of course, in an alternative embodiment, the sheet 84 could have an RA less than 0.8 or greater than 4.0. Also, in one exemplary embodiment, the sheet 84 further includes a pressure sensitive adhesive 83 (shown in FIG. 10) disposed on one side of the sheet 84 that is used to attach the sheet 84 on the first side 90 of the plate 80 wherein the first side 90 has an abrasive brazing residue disposed thereon. Of course, in alternative embodiments, the sheet 84 could be coupled to the plate 80 utilizing other coupling devices known to those skilled in the art. Further, in one exemplary embodiment, the sheet 84 is generally rectangular-shaped and is sized to cover substantially all of a generally rectangular-shaped side surface of the battery cell 30. Of course, in alternative embodiments, the sheet 84 could have other shapes and sizes known to those skilled in the art. The sheet 84 is configured to transfer heat energy from the battery cell 30 to the generally rectangular-shaped aluminum plate 80. Further, the plate 80 is configured to transfer at least a portion of the heat energy to the tube 82. In particular, for example, the sheet 80 could comprise "Spreadershield SS-400" manufactured by GrafTech International Holdings Inc.

Referring to FIG. 4, during operation, a refrigerant or a liquid enters the inlet port 120 from a source device and flows through the tube portions 122, 124, 126, 128, 130 to the outlet port 132 and exits the outlet port 132 to a receiving device. Heat energy generated by the battery cell 30 is conducted through the flexible thermally conductive sheet 84 and the rectangular-shaped aluminum plate 80 to the tube 82. Further, heat energy generated by the battery cell 32 is conducted through the rectangular-shaped aluminum plate 80 to the tube 82. Further, the heat energy in the tube 82 is conducted into the refrigerant or the liquid flowing through the tube 82. Thus, the refrigerant or the liquid flowing through the tube 82 absorbs the heat energy from the battery cells 30, 32 to reduce a temperature of the battery cell 30, 32.

Referring to FIGS. 1, 5, 6, 8 and 9, a flowchart of a method for manufacturing the cooling fin 40 utilizing a stamping machine 170 and a brazing machine 172, in accordance with another exemplary embodiment will now be explained.

At step 150, an operator provides the generally rectangular-shaped aluminum plate 80, the tube 82, and the flexible thermally conductive sheet 84. The generally rectangular-shaped aluminum plate 80 has the first side 90 and the second side 92.

At step 152, the stamping machine 170 forms an arcuate-shaped groove 109 on the first, second, third, and fourth peripheral edge portions 100, 102, 104, 106 of the generally rectangular-shaped aluminum plate 80.

At step 154, the operator disposes the tube 82 in the arcuate-shaped groove 109 such that the tube 82 is disposed on the first, second, third, and fourth peripheral edge portions 100, 102, 104, 106 of the generally rectangular-shaped aluminum plate 82.

At step 156, the brazing machine 172 brazes the tube 82 to the first side 90 of the generally rectangular-shaped aluminum plate 80 such that the tube 82 is attached to the first, second, third, and fourth peripheral edge portions 100, 102, 104, 106 of the generally rectangular-shaped aluminum plate 82.

At step 158, the operator attaches the flexible thermally conductive sheet 84 on the first side 90 of the generally rectangular-shaped aluminum plate 80.

The battery cell assembly 10 and the method for manufacturing the cooling fin 40 provide a substantial advantage over other battery cell assemblies and methods. In particular, the battery cell assembly 10 and the method provide a technical effect of utilizing a cooling fin 40 with a flexible thermally conductive sheet 84 disposed on a relatively rough surface of the cooling fin 40 such that the flexible thermally conductive sheet 84 is disposed against the adjacent battery cell to prevent abrasive rubbing of the rough surface against the battery cell.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
   a cooling fin having a generally rectangular-shaped aluminum plate, a tube, and a flexible thermally conductive graphite sheet;
   the generally rectangular-shaped aluminum plate having a first side and a second side; the generally rectangular-shaped aluminum plate defining at least first, second, third, and fourth arcuate-shaped peripheral edge portions;
   the tube coupled to the first side of the generally rectangular-shaped aluminum plate, the tube being disposed on the first, second, third, and fourth arcuate-shaped peripheral edge portions of the generally rectangular-shaped aluminum plate in an arcuate-shaped groove defined by the first, second, third, and fourth arcuate-shaped peripheral edge portions;
   the flexible thermally conductive graphite sheet having an adhesive disposed on one side of the flexible thermally conductive graphite sheet, the adhesive being further disposed on the first side of the generally rectangular-shaped aluminum plate to couple the flexible thermally conductive graphite sheet to the first side; and a battery cell disposed against the flexible thermally conductive graphite sheet of the cooling fin.

2. The battery cell assembly of claim 1, wherein the flexible thermally conductive graphite sheet is configured to transfer heat energy from the battery cell to the generally rectangular-shaped aluminum plate, the generally rectangular-shaped aluminum plate is configured to transfer at least a portion of the heat energy to the tube.

3. The battery cell assembly of claim 2, wherein the tube is configured to transfer at least a portion of the heat energy to a liquid or a refrigerant flowing through the tube.

4. The battery cell assembly of claim 1, wherein the tube is an aluminum tube.

5. The battery cell assembly of claim 1, wherein the flexible thermally conductive graphite sheet is generally rectangular-shaped and is sized to cover substantially all of a generally rectangular-shaped side surface of the battery cell.

6. The battery cell assembly of claim 1, wherein the flexible thermally conductive graphite sheet has a roughness average in a range of 0.8-4.0 micro-inches.

7. The battery cell assembly of claim 1, further comprising first and second rectangular-shaped frame members, the cooling fin and the battery cell being disposed between the first and second rectangular-shaped frame members.

8. The battery cell assembly of claim 1, wherein first, second, third, and fourth ends of the flexible thermally conductive sheet are disposed proximate to first, second, third, and fourth tube portions, respectively, of the tube.

9. A battery cell assembly, comprising:
a cooling fin having a generally rectangular-shaped aluminum plate, a tube, and a flexible thermally conductive sheet, the flexible thermally conductive sheet including graphite therein;
the generally rectangular-shaped aluminum plate having a first side and a second side and having a substantially uniform thickness between the first side and the second side; the generally rectangular-shaped aluminum plate defining at least first, second, and third arcuate-shaped peripheral edge portions;
the tube coupled to the first side of the generally rectangular-shaped aluminum plate, the tube being disposed on the first, second, and third arcuate-shaped peripheral edge portions in an arcuate-shaped groove defined by the first, second, and third arcuate-shaped peripheral edge portions;
the flexible thermally conductive sheet being directly coupled to the first side of the generally rectangular-shaped aluminum plate such that first, second, and third ends of the flexible thermally conductive sheet are disposed proximate to first, second, and third tube portions, respectively, of the tube; and
a battery cell disposed against the flexible thermally conductive sheet of the cooling fin.

10. The battery cell assembly of claim 9, wherein the flexible thermally conductive sheet is disposed on the first side between the first, second, and third arcuate-shaped peripheral edge portions.

11. The battery cell assembly of claim 9, wherein the flexible thermally conductive sheet has an adhesive disposed on one side of the flexible thermally conductive sheet, the adhesive being further disposed on the first side of the generally rectangular-shaped aluminum plate to couple the flexible thermally conductive sheet to the first side.

12. The battery cell assembly of claim 9, wherein an apex of the first arcuate-shaped peripheral edge portion is disposed a predetermined distance away from a remaining portion of the generally rectangular-shaped aluminum plate.

13. The battery cell assembly of claim 9, wherein the flexible thermally conductive sheet has an in-plane heat conductivity greater than 200 Watts/meter-Kelvin.

\* \* \* \* \*